United Stat [11] 3,903,518
Hatsukano [45] Sept. 2, 1975

[54] DRIVING SYSTEM FOR LIQUID CRYSTAL DISPLAY DEVICE

[75] Inventor: Yoshikazu Hatsukano, Kodaira, Japan

[73] Assignee: Hitachi, Ltd., Japan

[22] Filed: Nov. 27, 1973

[21] Appl. No.: 419,348

[30] Foreign Application Priority Data
Nov. 27, 1974 Japan.............................. 49-118075

[52] U.S. Cl............ 340/336; 307/313; 350/160 LC
[51] Int. Cl.²............................................. G08B 5/36
[58] Field of Search......... 340/324 R, 336; 307/313; 350/160 LC

[56] References Cited
UNITED STATES PATENTS

| | | | |
|---|---|---|---|
| 3,653,745 | 4/1972 | Mao............................. | 350/160 LC |
| 3,740,717 | 6/1973 | Huener........................ | 340/166 EL |
| 3,760,406 | 9/1973 | Walton......................... | 340/336 |
| 3,776,615 | 12/1973 | Tsukamoto et al............ | 350/160 LC |
| 3,780,523 | 12/1973 | Naito............................. | 340/336 X |
| 3,781,864 | 12/1973 | Fujita............................ | 340/336 |
| 3,789,388 | 1/1974 | Medwin........................ | 340/336 |
| 3,797,225 | 3/1974 | Hama et al................... | 350/160 LC |

*Primary Examiner*—David L. Trafton
*Attorney, Agent, or Firm*—Craig & Antonelli

[57] ABSTRACT

A driving system for liquid crystal display devices comprises a plurality of sets of liquid crystal display devices. Each set includes a liquid crystal whose state changes visually at a visual threshold voltage and first and second electrodes which serve to apply potential differences to the liquid crystal. Potentials of a high level, a low level and a medium level are selectively applied to the respective first electrodes, and the potentials of the high level and the low level are selectively applied to the respective second electrodes. The potential difference between the high level potential to be applied to the first electrodes and the low level potential to be applied to the second electrode, and the potential difference between the low level potential to be applied to the first electrodes and the high level potential to be applied to the second electrodes have values larger than the visual threshold voltage. The potential difference between the medium level potential to be applied to the first electrodes and the high or low level potential to be applied to the second electrodes has a value smaller than the visual threshold voltage.

4 Claims, 7 Drawing Figures

DRIVING SYSTEM FOR LIQUID CRYSTAL DISPLAY DEVICE

BACKGROUND OF THE INVENTION

1. Field of the Invention

The present invention relates to a driving system for a liquid crystal display device which mechanically has the properties of a liquid and which optically has the properties of a solid (crystal).

2. Description of the Prior Art

Because of its low power consumption, the liquid crystal display device has come into use in devices such as an electronic wrist watch, a small-sized electronic desk calculator, etc. having battery power source.

As the physical operation modes of the liquid crystal display device, there have been known the dynamic scattering mode (DSM), the field effect mode (FEM), etc. As the optical operation modes, there have been known the reflection type, the transmission type, the absorption type, etc.

The present invention can be commonly applied to any of the modes.

Here, explanation will be made with the DSM reflection type taken as an example.

The DSM reflection type liquid crystal display device exploits the phenomenon called the dynamic scattering mode in which, when a liquid crystal is placed between two opposing electrodes and a voltage is applied therebetween, the molecules of the liquid crystal having been arrayed in a fixed direction at first are irregularly oriented, so that incident light is scattered and that the liquid crystal is changed from a transparent state to a semitransparent (Whitish) state. The construction and phenomenon of such liquid crystal display device are described in, for example, the following literature: "Electronics," July 6, 1970, pp. 64 – 70; "Transistor Gijutsu" (a Japanese publication), August 1971, pp. 104 – 109.

In designing a driver circuit for such a liquid crystal display device, the life of the liquid crystal must be a major consideration.

It is known that, when a DC component is applied to the liquid crystal for a long period of time, the life of the liquid crystal becomes short. It is, accordingly, a general practice to drive the liquid crystal bidirectionally. Concretely, a predetermined voltage is applied across the electrodes at both the ends of the liquid crystal for a certain period of time. Subsequently, the polarity of the voltage is inverted, and the inverted voltage is applied for the same period of time. Such a bidirectional liquid-crystal drive circuit is stated in "nikkei Electronics" (a Japanese publication), July 31, 1972 (or "Electronics," Apr. 10, 1972).

A problem of the bidirectional liquid-crystal drive system is that, since the potentials of common electrodes (digit electrodes) change during the period of selection, it is difficult to adopt the dynamic indication system which is conventional in driver circuits for discharge type display tubes, light emitting diodes and so forth.

In this respect, the technique described in the above-mentioned literature has been employed for a dynamic indication in such a way that the selection of the common electrodes is performed with low-frequency pulses and high-frequency pulses by exploiting the frequency characteristics of the liquid crystal. As described in the literature, however, this system has the disadvantages that high frequencies increase the electric power required for the indication, that the adjustment of the cutoff frequency of the liquid crystal is delicate, and that the application of the system is very costly.

SUMMARY OF THE INVENTION

It is, accordingly, a principal object of the present invention to provide a driving system for a liquid crystal display device which can simply adopt a dynamic indication system.

In order to accomplish this object, the present invention consists in that the employed liquid crystal display devices have a visual threshold voltage $V_{th}$, so that the visual (optical) states are simply controlled through only the control of voltage levels by exploiting the presence of the threshold voltage, whereby a dynamic indication is made possible.

Among liquid crystals, there are those the visual state of which gradually changes in dependence on the applied voltage, and those in which, as illustrated in the characteristic diagram of FIG. 1 of the accompanying drawings, the visual state rapidly changes with the boundary at a certain determined applied voltage; in other words, which have a visual threshold voltage. Liquid crystal display devices of the latter type are described in, for example, "Applied Physics Letters," Vol. 19, No. 10, pp. 391 - 393; "Transistor Gijutsu," previously mentioned; and the catalog of a liquid crystal display device put on the market under the product name "DNM – 1" by Dai-Nippon Toryo Co., Ltd. (a Japanese manufacturer).

Employed in the present invention are the latter type liquid crystal display devices.

The control of voltage levels is carried out in such a way that voltage sources of three-valued levels ($V_H$, $V_M$ and $V_L$) are employed, that a potential difference $|V_H - V_L|$ is applied between a digit electrode selected and a segment electrode selected for the dynamic indication, the polarities of the potential difference being continually inverted, and that the potential $V_M$ at the medium position between the potential $V_H$ and the potential $V_L$ $\{V_H > V_M > V_L, V_M = (V_H + V_L)/2\}$ is applied to common electrodes not selected. Accordingly, the potential differences $|V_H - V_M|$ and $|V_M - V_L|$ are applied between the digit electrodes not selected and all the segment electrodes.

If the potential difference $|V_H - V_L|$ is set to be larger than the visual (optical) threshold voltage $V_{th}$ of the liquid crystal and the potential differences $|V_H - V_M|$ and $|V_M - V_L|$ are set to be smaller than the threshold voltage $V_{th}$, then the dynamic indication can be simply effected without impressing any DC component on the liquid crystal. Moreover, it is possible to prevent crosstalk which comes into question in a prior-art driver circuit for matrix type liquid crystal display devices ("Nikkei Electronics," May 8, 1972, pp. 32 – 43).

In accordance with another embodiment of the present invention, the medium potential $V_M$ is also applied to the segment electrodes not selected, so that only the potential differences $|V_H - V_M|$ and $|V_M - V_L|$ are applied between the selected segment electrode and the other segment electrodes, whereas a potential difference as large as $|V_H - V_L|$ is not applied, whereby the visual state of the liquid crystal can be prevented from changing due to the potential difference between the segment electrodes.

The present invention itself and further objects of the present invention will become apparent from the following description taken in conjunction with the accompanying drawings.

BRIEF DESCRIPTION OF THE DRAWINGS

FIG. 2a is a diagram of a driver circuit for liquid crystal display devices according to the present invention, while FIG. 2b is a timing diagram for explaining the operation of the driver circuit of FIG. 2a;

FIG. 3a is a diagram of another embodiment of the driver circuit, while FIG. 4a is a diagram of still another embodiment of the driver circuit, while

DETAILED DESCRIPTION OF THE INVENTION

Figure 2A:
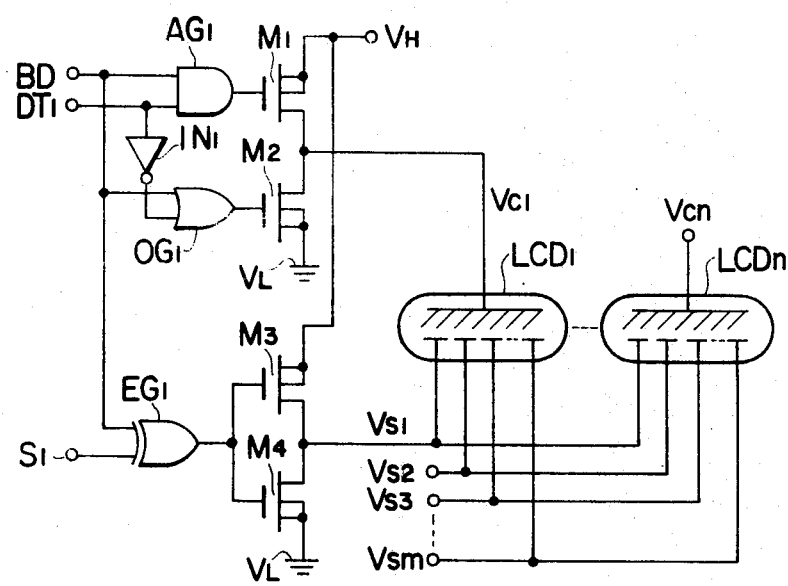

FIG. 2a shows a driver circuit which is constructed in conformity with the driving system for liquid crystal display devices according to the present invention.

In the figure, $LCD_1 - LCD_n$ designate liquid crystal display devices. An oblique line part in each display device denotes a liquid crystal; $n$ electrodes on the upper side are digit electrodes, while $m$ electrodes on the lower side as provided for each digit electrode are segmented electrodes which are so arranged that predetermined characters, letters or the like can be represented. The corresponding segment electrodes of the respective digits are commonly connected.

$M_1$ and $M_3$ indicate insulated gate field-effect transistors (hereinbelow, simply termed "transistors") of the P-channel type, and $M_2$ and $M_4$ transistors of the N-channel type. The transistors $M_1 - M_4$ constitute two complementary circuits. The source electrodes of the transistors $M_1$ and $M_3$ are connected to a voltage source $V_H$, while the source electrodes of the transistors $M_2$ and $M_4$ are grounded (potential $V_L$).

$AG_1$, $OG_1$ and $EG_1$ designate an AND circuit, an OR circuit and an exclusive OR circuit, respectively.

The digit electrode of the liquid crystal display device $LCD_1$ is applied with an output voltage $VC_1$ of the complementary circuit on the upper side. The segment electrode at the left end of the display device $LCD_1$ as viewed in the figure is applied with an output signal $V_{s1}$ of the complementary circuit on the lower side.

BD represents a bidirectional liquid-crystal drive pulse for driving the liquid crystal bidirectionally. $DT_1$ ($-DT_n$) and $S_1$ ($-S_n$) represent a digit selecting signal and a segment selecting signal, respectively.

Figure 2B:
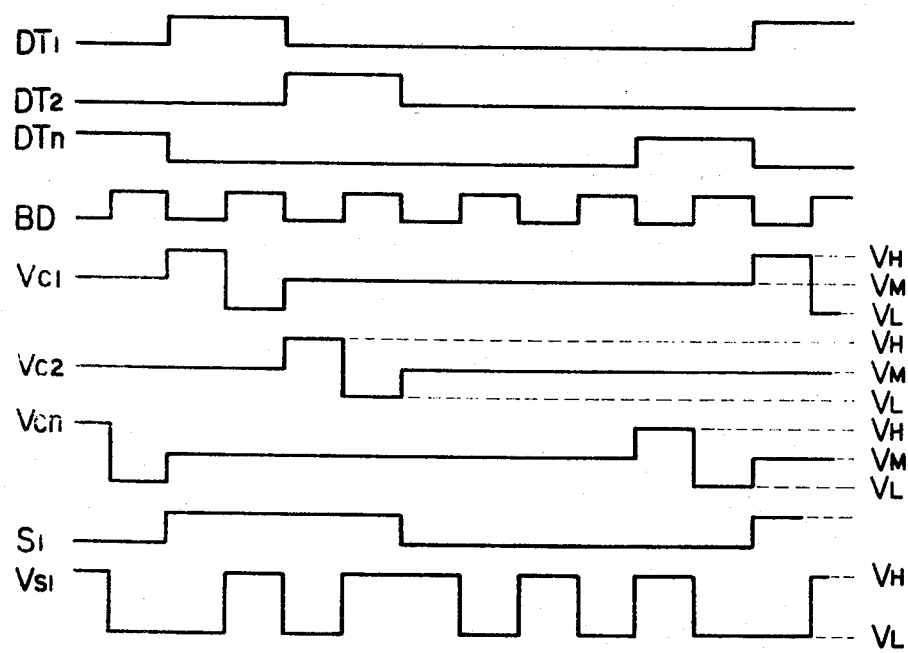

The operation of the circuit will now be described. In order to facilitate the description, the relations among the bidirectional drive pulse BD, the digit and segment selecting signals $DT_1$ and $S_1$, and potentials $V_{c1}$ and $V_{s1}$ applied to the digit electrode and the segment electrode are illustrated in the timing diagram of FIG. 2b and in the following Table I Table I

| $DT_1$ | BD | $V_{c1}$ | $S_1$ | BD | $V_{s1}$ |
|---|---|---|---|---|---|
| "1" | "1" | $V_L$ | "1" | "1" | $V_H$ |
| "1" | "0" | $V_H$ | "1" | "0" | $V_L$ |
| "0" | "1" | $V_M$ | "0" | "1" | $V_L$ |
| "0" | "0" | $V_M$ | "0" | "0" | $V_H$ |

(logic "1": positive potential,
logic "0": ground potential)

The transistors $M_1$ and $M_2$ are both rendered conductive when the digit selecting signal $DT_1$ becomes O. Then, the complementary circuit constitutes a voltage divider. The potential $V_M$ is the divided voltage at that time. The values of the potentials $V_M$, $V_H$ and $V_L$ are determined so as to satisfy the following relations: $|V_H - V_L| \geq V_{th}$, $|V_H - V_M| < V_{th}$, $|V_M - V_L| < V_{th}$.

If, when the digit selecting signal $DT_1$ becomes 1 to select the left-end digit electrode, the left-end segment electrode for which the segment selecting signal $S_1$ becomes 1 is selected, then pulses of the opposite phases are applied to both the electrodes, that is, the potential difference $|V_H - V_L|$ is applied bidirectionally. Since $|V_H - V_L| \geq V_{th}$, the liquid crystal interposed between both the electrodes induces scattering. If the segment selecting signal $S_1$ is O at this time, in-phase pulses are applied to both the electrodes. The potential difference between both the electrodes is accordingly null, so that the liquid crystal interposed therebetween does not induce scattering.

On the other hand, when the digit selecting signal $DT_1$ becomes O, the value of the potential $V_{c1}$ applied to the left-end digit electrode becomes that of the medium potential $V_M$ irrespective of the state of the bidirectional drive pulse. Even if the voltages applied to any segment electrodes change to the potentials $V_H$ and $V_L$, the liquid crystal corresponding to the left-end common electrode induces no scattering under the conditions $|V_H - V_M| < V_{th}$ and $|V_M - V_L| < V_{th}$. In this case, in order to prevent any DC component from being applied to the liquid crystal, it is more preferable to set the medium potential $V_M$ at the following value or to bring it as close to the value as possible:

$$V_H - V_M = V_M - V_L, \therefore V_M = \frac{V_H + V_L}{2}$$

In accordance with the foregoing embodiment, since the selection of the digit electrodes is made with the levels of voltages by exploiting the fact that the liquid crystal has the visual threshold voltage $V_{th}$, the problems raised in the selecting system with frequencies as in the prior art are not encountered. Furthermore, since the driving voltage levels are of the three values, the dynamic indication can be readily accomplished even with the bidirectional drive system.

Figure 3A:
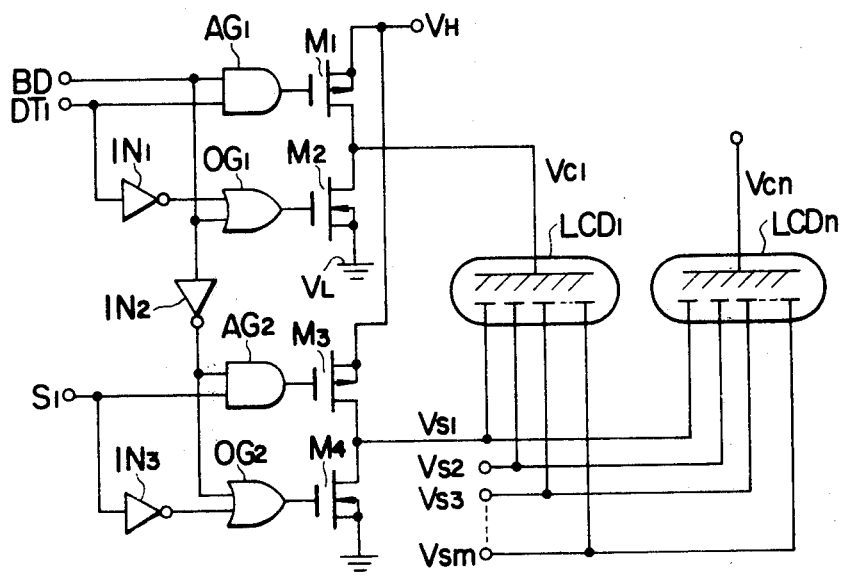

FIG. 3a shows another embodiment of the driver circuit for explaining the driving system for liquid crystal display devices according to the present invention.

The point of essential difference of the circuit in FIG. 3a from that in FIG. 2a is that, when the segment electrodes are not selected, they are also applied with the medium potential $V_M$.

Accordingly, as compared with the embodiment in FIG. 2a, the embodiment in FIG. 3a differs in the input parts of the transistors $M_3$ and $M_4$.

Figure 3B:
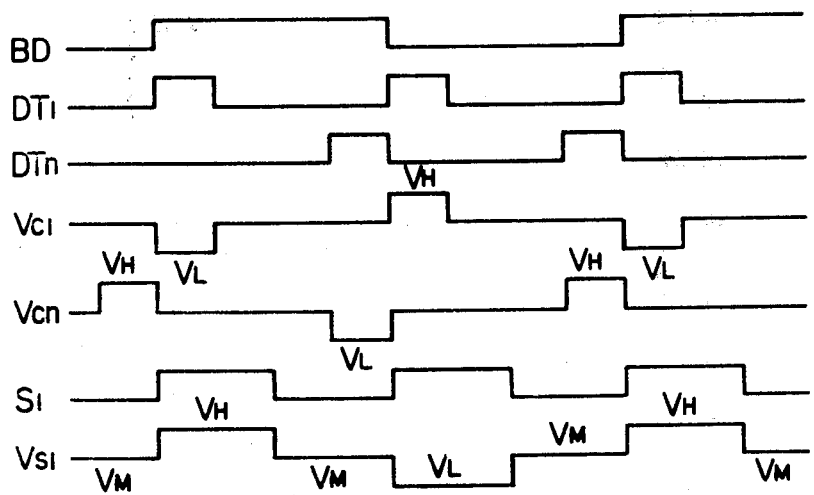
FIG. 3b is a timing diagram for explaining the operation thereof.

The relations among the bidirectional drive pulse BD, the digit selecting signal $DT_1$ and the potential $V_{c1}$ of the left-end digit electrode are the same as those of the circuit in FIG. 2a. The relations among the bidirectional drive pulse BD, the segment selecting signal $S_1$ and the potential $V_{s1}$ of the segment electrode are listed in the following Table II, and the relations among all these quantities are illustrated in the timing diagram of FIG. 3b. The transistors $M_3$ and $M_4$ constitute a voltage divider when the segment signal $S_1$ becomes O to render both of them conductive. The divided voltage $V_M$ at that time is set at the value as stated previously.

Table II

| $S_1$ | BD  | $V_{s1}$ |
|-------|-----|----------|
| "1"   | "1" | $V_H$    |
| "1"   | "0" | $V_L$    |
| "0"   | "1" | $V_M$    |
| "0"   | "0" | $V_M$    |

Thus, in accordance with this embodiment, a potential difference of only $|V_H - V_M|$ or $|V_M - V_L|$ is applied between the segment electrode selected and the segment electrode not selected. It is avoided that, as in the prior art, the potential difference $|V_H - V_L|$ between the selected segment electrode and common electrode is impressed between the segment electrodes as it is. The difference is made smaller, so that the change of the visual state of the liquid crystal attributed to the potential difference between the segment electrodes is preventable.

Figure 1:
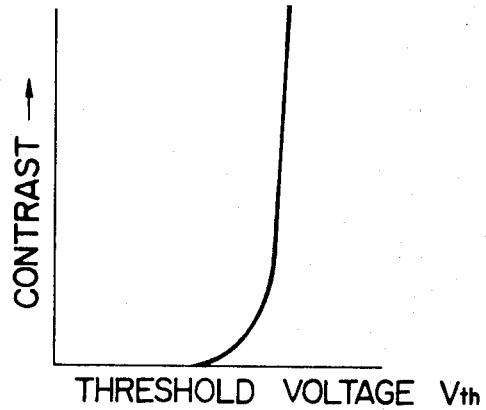
FIG. 1 is the diagram of the characteristic of a liquid crystal, described previously.
Figure 4A:
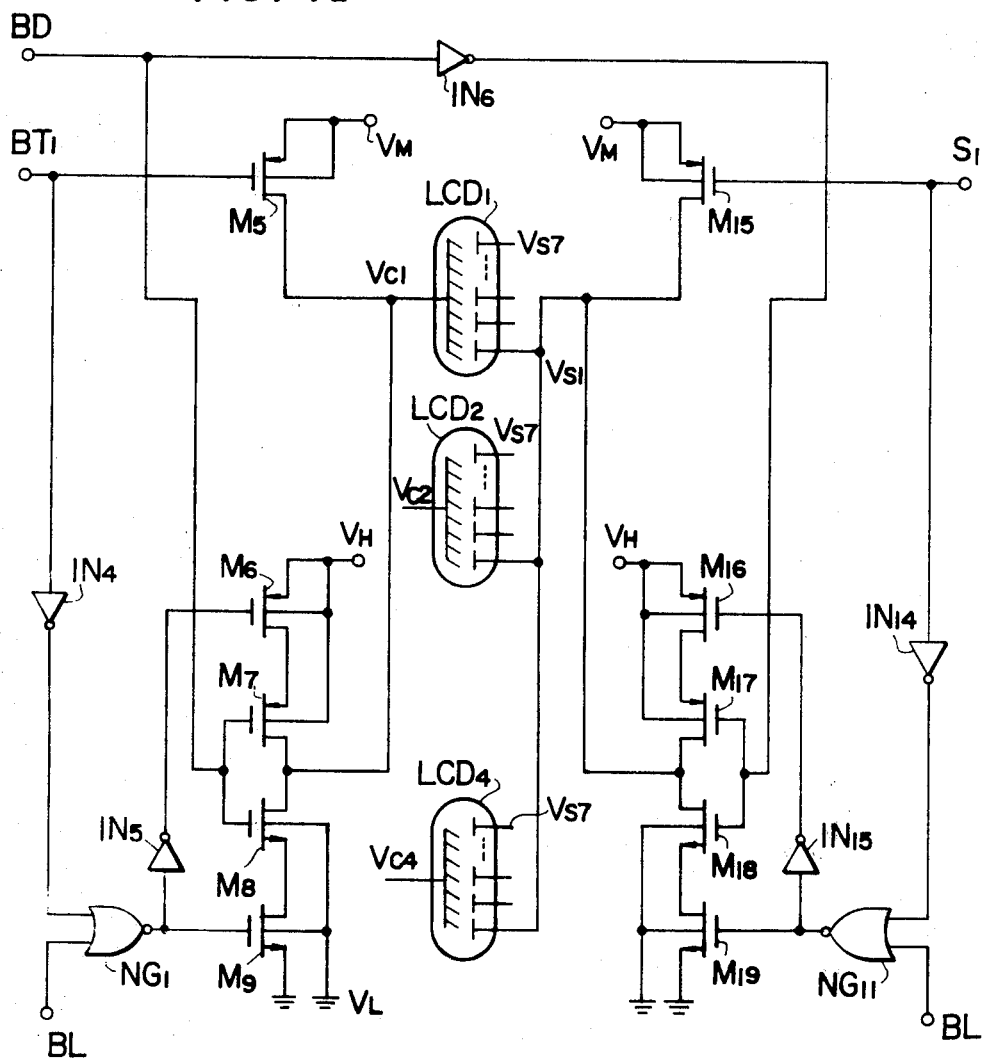

FIG. 4a shows still another embodiment of the driver circuit for liquid crystal display devices according to the present invention. This embodiment improves the circuit in FIG. 3a with respect to power consumption and has differences as stated below.

Figure 4B:
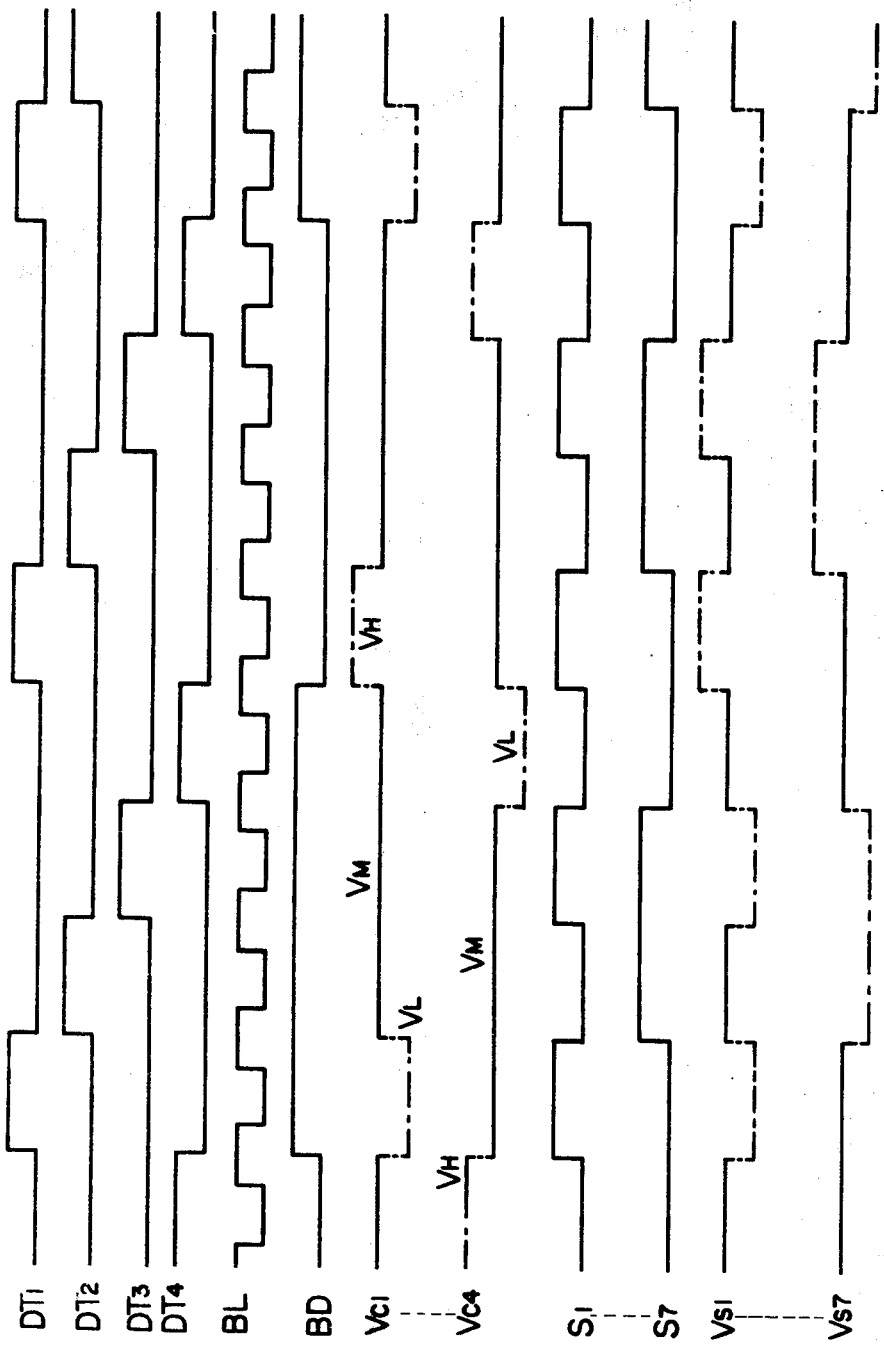
FIG. 4b is a timing diagram for explaining the operation thereof.

For the medium potential $V_M$, the voltage divider composed of the switching elements is not employed, but a separate power source is used. In order to prevent any current path from being established between the power source $V_M$ and the power source $V_H$ or $V_L$ at switching, transistors $M_6$, $M_9$ and transistors $M_{16}$, $M_{19}$ are rendered non-conductive at the switching by a blanking signal BL as shown in FIG. 4b. The pulse width of the blanking signal BL must be longer than the switching time. When, however, it is made longer than is necessary, the electrode potential of the liquid crystal is held in the floating state for a long time, and hence, the problem of crosstalk takes place. Care is required in this respect.

The relations among the electrode potentials $V_{c1}$ and $V_{s1}$ of the liquid crystal display device and the signals $DT_1$, $S_1$, BD and BL are given in FIG. 4b and the following Table III.

Table III

| $DT_1$ | BD  | BL  | $V_{c1}$ | $S_1$ | BD  | BL  | $V_{s1}$ |
|--------|-----|-----|----------|-------|-----|-----|----------|
| "0"    | "0" | "0" | $V_M$    | "0"   | "0" | "0" | $V_M$    |
| "0"    | "0" | "1" | $V_M$    | "0"   | "0" | "1" | $V_M$    |
| "0"    | "1" | "0" | $V_M$    | "0"   | "1" | "0" | $V_M$    |
| "0"    | "1" | "1" | $V_M$    | "0"   | "1" | "1" | $V_M$    |
| "1"    | "0" | "0" | $V_H$    | "1"   | "0" | "0" | $V_L$    |
| "1"    | "0" | "1" | FL       | "1"   | "0" | "1" | FL       |
| "1"    | "1" | "0" | $V_L$    | "1"   | "1" | "0" | $V_H$    |
| "1"    | "1" | "1" | FL       | "1"   | "1" | "1" | FL       |

FL: floating state (floating potential)

Although the present invention has been described along the preferred embodiments, it can adopt various modification means without being restricted to them.

For example, the present invention is applicable, not only to the liquid crystal display devices of the segment type, but also to those of the matrix type (in this case, the digit electrodes may also be formed in correspondence with individual segment electrodes). For the medium voltage $V_M$, a pulse whose potential varies with time can also be used insofar as the previously-mentioned conditions are met (in this case, if the mean value of the medium potential $V_M$ is made $(V_H + V_L)/2$, the DC component can be fully eliminated). As the constituent elements of the driver circuit, there can also be utilized the transistors of the signle channel, bipolar transistors, passive elements, etc. Further, the liquid crystal display devices may be separately arranged so as to correspond to the respective segment electrodes, or may be commonly arranged so as to correspond to one or more digits.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What I claim is:

1. A system for selectively driving a plurality of liquid crystal display devices, each liquid crystal display device including a first common electrode, a plurality of second electrodes spaced apart from said first electrode and from each other, and a liquid crystal medium the visible state of which changes from a first state to a second state at a predetermined voltage difference thereacross, said liquid crystal medium being interposed between said first and second electrodes, said system comprising:

first means, coupled to a first common electrode of one of said display devices, for selectively applying thereto a voltage corresponding to a selected one of first, second and third voltage levels; and second means, coupled to selected ones of the second electrodes of said plurality of liquid crystal display devices for selectively applying thereto a voltage corresponding to a selected one of said first, second and third voltages;

wherein the absolute value of the difference between said first and second voltages is equal to at least said predetermined voltage difference, and the respective absolute values of the differences between said first and third voltage and between said second and third voltages is less than said predetermined voltage difference.

2. A system according to claim 1, further including means for controlling the application of said first, second and third voltages by said first and second means, so that said third voltage is supplied by said first and second means simultaneously, and exclusively of the application of said first or second voltage and said second or first voltage by said first and second means, respectively.

3. A system for selectively driving a plurality of liquid crystal display devices, each liquid crystal display device including a first common electrode, a plurality of second electrodes spaced apart from said first electrode and from each other, and a liquid crystal medium the visible state of which changes from a first state to a second state at a predetermined voltage difference thereacross, said liquid crystal medium being interposed between said first and second electrodes, said system comprising:

first means, coupled to a first common electrode of one of said display devices, for selectively applying thereto a voltage corresponding to a selected one of first, second and third voltage levels, said first means including first and second switching elements, each having an input electrode, an output electrode, and a control electrode, the input electrodes of said elements being respectively connected to said first and second voltages, the output elelctrodes of said elements being connected to said first common electrode, and a first logic means, connected to the control electrodes of said first and second switching elements, for making said first switching element conductive in a first period of time to supply said first voltage to said first common electrode, for making said second switching element conductive in a second period of time to supply said second voltage to said second common electrode, and for making both of said first and second switching elements simultaneously conductive to supply said third voltage which is an intermediate value between said first and second value determined by the resistance ratio of the first and second switching elements; and second means, coupled to selected ones of the second electrodes of said plurality of crystal display devices, for selectively applying thereto a voltage corresponding to a selected one of said first and second voltages;

wherein the absolute value of the difference between said first and second voltages is equal to at least said predetermined voltage difference, and the respective absolute values of the differences between said first and third voltage and between said second and third voltages is less than said predetermined voltage difference.

4. A system according to claim 3, wherein said second means includes third and fourth switching elements, each having an input electrode, an output electrode, and a control electrode, the input electrodes of said third and fourth switching elements being respectively connected to said first and second voltages, the output electrodes of said third and fourth switching elements being connected to a selected one of said second electrodes, and a second logic means connected to the control electrodes of said third and fourth switching elements for making said third and fourth switch elements conductive complementarily.

* * * * *